US009967618B2

(12) United States Patent
Blong et al.

(10) Patent No.: US 9,967,618 B2
(45) Date of Patent: May 8, 2018

(54) CAPTURING A USER REACTION TO MEDIA CONTENT BASED ON A TRIGGER SIGNAL AND USING THE USER REACTION TO DETERMINE AN INTEREST LEVEL ASSOCIATED WITH A SEGMENT OF THE MEDIA CONTENT

(71) Applicant: Verizon Patent and Licensing Inc., Arlington, VA (US)

(72) Inventors: Devin Blong, Penngrove, CA (US); Tina Chou, San Jose, CA (US); I-Han Chen, Fremont, CA (US); Tushar Chaudhary, Mountain View, CA (US); Paresh Vakhariya, Cupertino, CA (US); Annu Yadav, San Francisco, CA (US); Mat Mejia, San Leandro, CA (US); Jason Goldsmith, San Jose, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 14/737,772

(22) Filed: Jun. 12, 2015

(65) Prior Publication Data

US 2016/0366203 A1 Dec. 15, 2016

(51) Int. Cl.
*H04N 21/442* (2011.01)
*G06Q 30/02* (2012.01)
(Continued)

(52) U.S. Cl.
CPC ... *H04N 21/44218* (2013.01); *G06Q 30/0201* (2013.01); *H04H 60/33* (2013.01);
(Continued)

(58) Field of Classification Search
CPC ....... H04L 65/604; H04L 51/10; H04L 51/32; H04L 65/4084; H04L 65/1086;
(Continued)

(56) References Cited

U.S. PATENT DOCUMENTS

| 7,603,682 | B1* | 10/2009 | Akiyama | H04H 20/82 |
| | | | | 725/139 |
| 7,889,073 | B2* | 2/2011 | Zalewski | G06F 3/012 |
| | | | | 340/500 |

(Continued)

OTHER PUBLICATIONS

Busso et al., "Analysis of Emotion Recognition using Facial Expressions, Speech and Multimodal Information", ICMI'04, Oct. 13-15, 2004, 7 pages.*
Wikipedia, "SoundCloud," http://en.wikipedia.org/wiki/SoundCloud, Jun. 5, 2015, 8 pages.

*Primary Examiner* — Brian J Gillis
*Assistant Examiner* — Amy Ling

(57) ABSTRACT

A device may receive an indication of a playback of media content. The device may receive a trigger signal associated with the playback of the media content. The trigger signal may indicate a point, within the playback of the media content, to capture user reaction information associated with the media content. The device may determine, based on the trigger signal, that the user reaction information is to be captured. The device may capture the user reaction information, to form captured user reaction information, based on determining that the user reaction information is to be captured. The captured user reaction information may include an audio recording or a video recording captured by the device. The device may cause the captured user reaction information and the media content to be linked.

20 Claims, 11 Drawing Sheets

(51) Int. Cl.

| | |
|---|---|
| *H04N 21/458* | (2011.01) |
| *H04H 60/37* | (2008.01) |
| *H04H 60/33* | (2008.01) |
| *H04H 60/46* | (2008.01) |
| *H04L 12/58* | (2006.01) |
| *H04L 29/06* | (2006.01) |
| *H04N 21/422* | (2011.01) |
| *H04N 21/4223* | (2011.01) |

(52) U.S. Cl.
CPC ............ *H04H 60/37* (2013.01); *H04L 51/10* (2013.01); *H04L 51/32* (2013.01); *H04L 65/1086* (2013.01); *H04L 65/4015* (2013.01); *H04L 65/4084* (2013.01); *H04N 21/4223* (2013.01); *H04N 21/42203* (2013.01); *H04N 21/44213* (2013.01); *H04N 21/4586* (2013.01); *H04H 60/46* (2013.01)

(58) Field of Classification Search
CPC .... H04L 65/4015; H04H 60/33; H04H 60/37; H04H 60/46; H04N 21/44218; G06Q 30/0201
See application file for complete search history.

(56) References Cited

U.S. PATENT DOCUMENTS

| | | | |
|---|---|---|---|
| 9,147,107 B2* | 9/2015 | Kaneda | G06K 9/00288 |
| 2009/0232354 A1* | 9/2009 | Camp, Jr. | G06Q 30/02 382/103 |
| 2013/0014142 A1* | 1/2013 | Newell | H04H 60/33 725/12 |
| 2013/0283162 A1* | 10/2013 | Aronsson | G11B 27/105 715/719 |
| 2013/0304820 A1* | 11/2013 | Vasquez | H04L 67/00 709/204 |
| 2013/0339433 A1* | 12/2013 | Li | G06K 9/00 709/204 |
| 2014/0024891 A1* | 1/2014 | Motoki | A61B 1/00045 600/103 |
| 2014/0282111 A1* | 9/2014 | Gurbag | H04L 65/403 715/756 |
| 2015/0020086 A1* | 1/2015 | Chen | H04N 21/44218 725/12 |
| 2015/0110471 A1* | 4/2015 | Zheng | H04N 5/76 386/291 |
| 2017/0251262 A1* | 8/2017 | Bist | G06F 17/30032 |

* cited by examiner

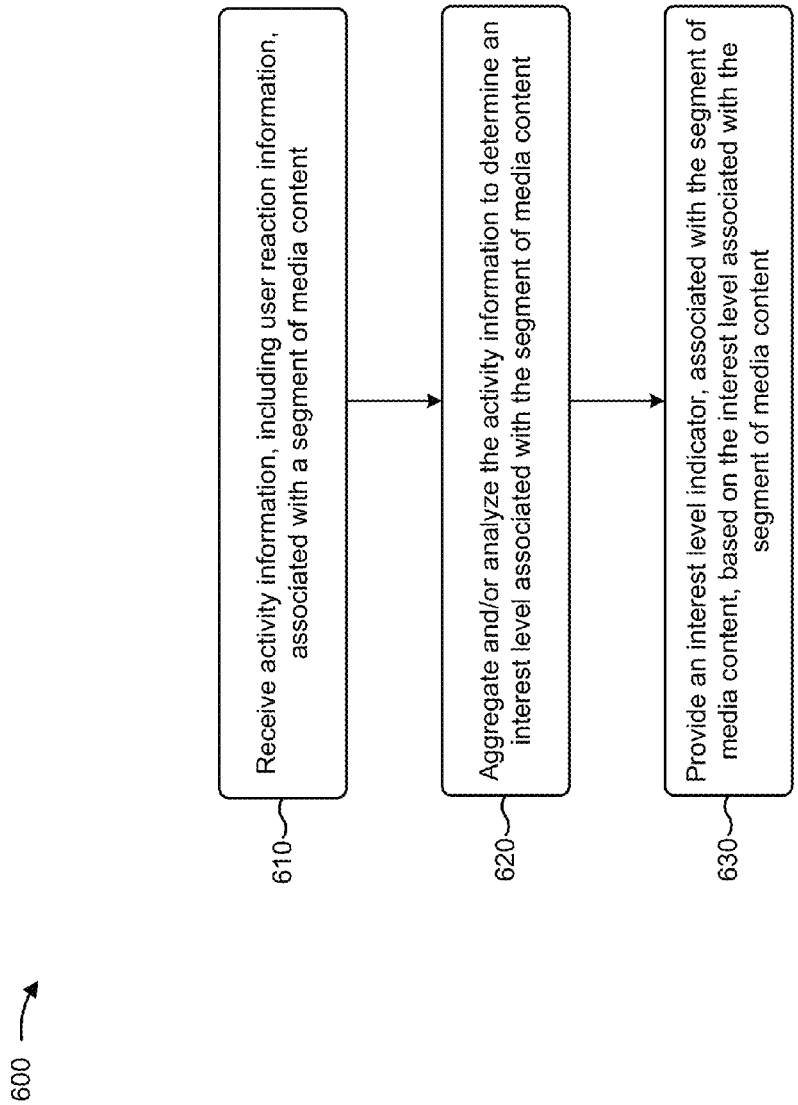

CAPTURING A USER REACTION TO MEDIA CONTENT BASED ON A TRIGGER SIGNAL AND USING THE USER REACTION TO DETERMINE AN INTEREST LEVEL ASSOCIATED WITH A SEGMENT OF THE MEDIA CONTENT

BACKGROUND

Media content may refer to audio, video, and/or textual content. Media content may be presented to a user (e.g., a viewer). The user may watch the media content, and may react to the media content. For example, a user may get excited, upset, scared, happy, sad, etc. when viewing media content, such as a sporting event, a television show, a movie, a video clip, a video recording, media content shared via social media, or the like.

BRIEF DESCRIPTION OF THE DRAWINGS

FIG. 6 is a flow chart of an example process for providing an interest level indicator, associated with a segment of media content, via a playback bar associated with the media content.

DETAILED DESCRIPTION OF PREFERRED EMBODIMENTS

The following detailed description of example implementations refers to the accompanying drawings. The same reference numbers in different drawings may identify the same or similar elements.

Media content, such as video content, audio content, textual content, or the like, may be presented to a user. A user may want to capture the user's reaction to the media content to share with other users. For example, a user may want to capture video and/or audio for the user's reaction to an exciting play in a sporting event (e.g., a goal, a touchdown, etc.), a particular scene in a movie or a television show (e.g., a scary scene, a happy scene, etc.), or the like. However, the user may not know when the exciting play or the particular scene occurs. As a result, the user may not know when to record the user's reaction.

Implementations described herein assist in determining when to record a user's reaction to a segment of media content based on detecting one or more trigger signals. In this way, a device that captures the user's reaction may conserve computing resources, and may save time for the user, by automatically capturing a short segment of a user reaction, rather than requiring the user to capture a long segment and edit the long segment to include only the user's reaction. Furthermore, implementations described herein may assist in linking a user reaction with media content that cause the user reaction, and may assist in identifying an interest level of different segments of the media content based on user reactions and other activity information associated with the media content.

Figure 1:
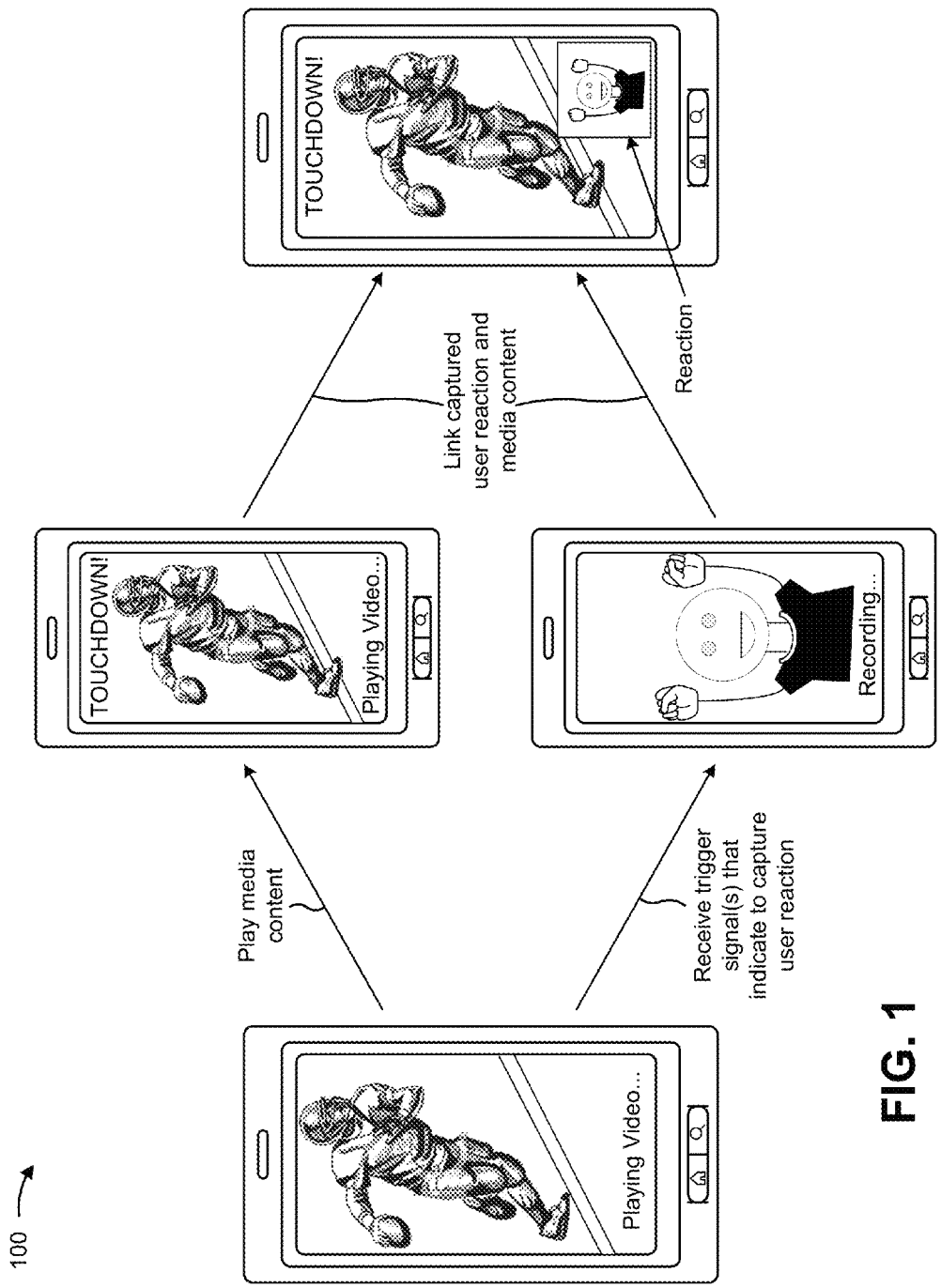
FIG. 1 is a diagram of an overview of an example implementation described herein.

FIG. 1 is a diagram of an overview of an example implementation 100 described herein. As shown in FIG. 1, a reaction monitoring device, such as a mobile phone, may play media content. For the purpose of FIG. 1, assume that the media content is a broadcast of a football game. As shown, the reaction monitoring device may receive one or more trigger signals that indicate when to capture a user reaction to the media content. As some examples, a trigger signal may include user input that indicates a segment of the media content during which the user reaction is to be captured, a signal determined based on processing the media content (e.g., by analyzing a volume of the media content, a frame rate of the media content, etc.), a signal determined based on processing information captured by the reaction monitoring device (e.g., a volume level captured by a microphone of the reaction monitoring device, etc), an environmental factor (e.g., a geographical location of the reaction monitoring device), or the like. These and other trigger signals are described in more detail elsewhere herein.

As shown, based on receiving the trigger signal(s), the reaction monitoring device may monitor a user reaction to the media content. For example, assume that the user's favorite team scores a touchdown during the football game, and the reaction monitoring device detects an elevated volume when the user celebrates the touchdown. In this case, the reaction monitoring device may capture the user reaction by recording vireo and/or audio of the user reaction. As further shown, the reaction monitoring device (or another device) may link the captured user reaction and the media content. For example, the captured user reaction and the media content may be linked such that both may be presented simultaneously, such as via a video that plays the media content along with a synchronized user reaction to the media content.

In this way, a user may easily capture and share the user's reaction to media content. Furthermore, the reaction monitoring device may conserve resources (e.g., processing power, memory usage, battery power, etc.) by only capturing relevant user reactions, rather than capturing both relevant and irrelevant user reactions and requiring the user to edit the captured content to reflect only the relevant user reactions.

Furthermore, an activity monitoring device may use the user reaction to determine an interest level associated with a segment of media content, as described in more detail elsewhere herein. For example, the user reaction may be associated with a particular segment of media content (e.g., a segment where a touchdown is scored, a segment corresponding to a scary scene of a movie, etc.). By aggregating and analyzing multiple user reactions to the media content, the activity monitoring device may determine an interest level associated with different segments of the media content. Furthermore, an interest level indicator may be provided via a playback bar of the media content, such that portions of the playback bar are displayed differently based on an interest level associated with media segments to which the portions of the playback bar correspond. In this way, a user may easily identify interesting segments of media content.

Figure 2:
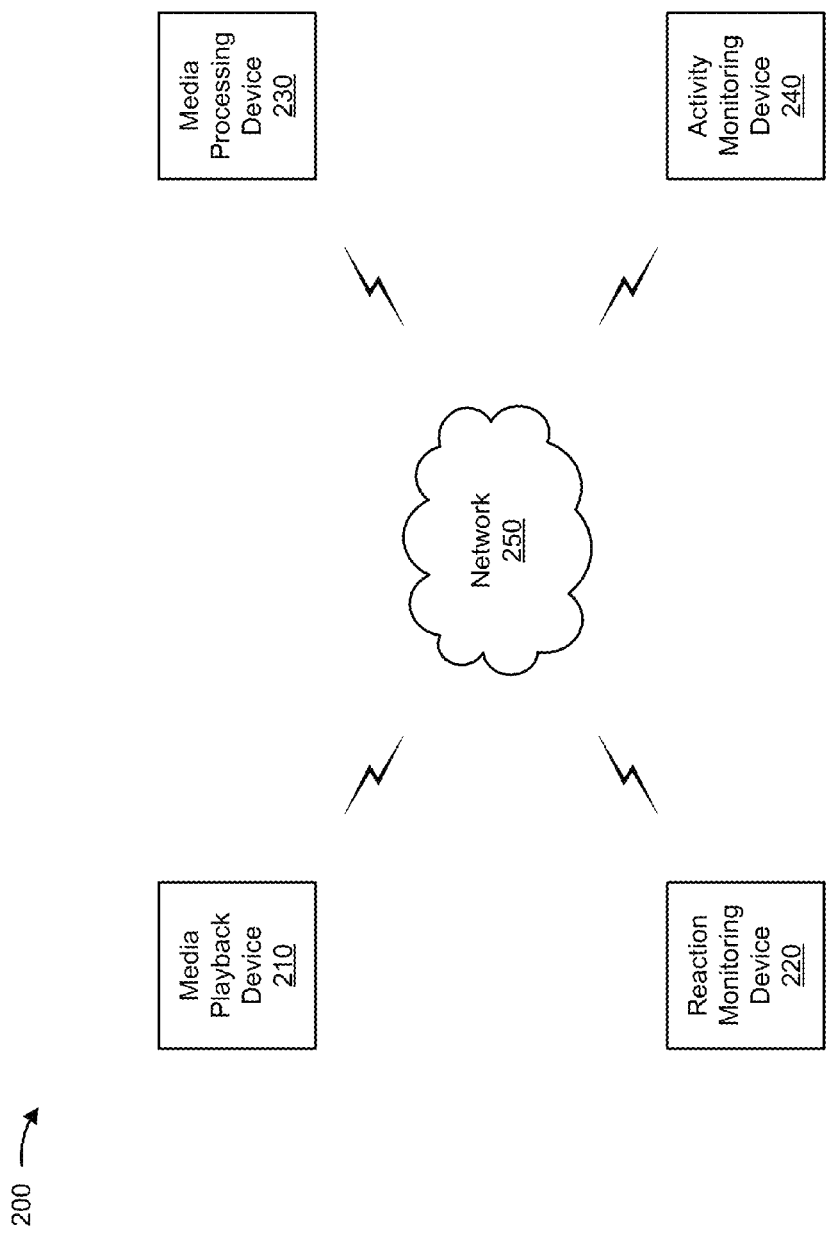
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media playback device 210, a reaction monitoring device 220, a media processing device 230, an activity monitoring device 240, and a network 250. Devices of environment 200 may interconnect via wired connections, wireless connections, or a combination of wired and wireless connections.

Media playback device 210 may include one or more devices capable of receiving, generating, storing, processing, and/or providing media content (e.g., video content, audio content, broadcast content, etc.). For example, media playback device 210 may include a television, a desktop computer, a laptop computer, a tablet computer, a mobile phone (e.g., a smart phone, a radiotelephone, etc.), a gaming device, a set-top box, or a similar type of device. In some implementations, media playback device 210 may include and/or may be connected to a display device capable of presenting the media content for display.

Reaction monitoring device 220 may include one or more devices capable of receiving, generating, storing, processing, providing, and/or capturing user reaction information (e.g., a recording of a user reaction to media content). For example, reaction monitoring device 220 may include a television, a desktop computer, a laptop computer, a tablet computer, a mobile phone (e.g., a smart phone, a radiotelephone, etc.), a gaming device, a set-top box, or a similar type of device. In some implementations, reaction monitoring device 220 may include and/or may be connected to a video capture component (e.g., a video recorder, a camcorder, a webcam, etc.), an audio capture component (e.g., an audio recorder, a microphone, etc.), or the like. Reaction monitoring device 220 may receive and or detect one or more trigger signals that indicate when to capture the user reaction information. Reaction monitoring device 220 may capture the user reaction information based on the one or more trigger signals.

In some implementations, media playback device 210 and reaction monitoring device 220 may be implemented in a single device. For example, a single device may present the media content, and may capture a user reaction to the media content. In some implementations, media playback device 210 and reaction monitoring device 220 may be implemented as separate devices. For example, media playback device 210 may present the media content, and reaction monitoring device 220 may capture the user reaction to the media content. In this case, media playback device 210 and reaction monitoring device 220 may communicate to identify the trigger signal(s).

Media processing device 230 may include one or more devices capable of receiving, generating, storing, processing, and/or providing user reaction information, and/or capable of linking user reaction information and media content associated with the user reaction information. For example, media processing device 230 may include a server device (e.g., a media server, an application server, a web server, etc.), a desktop computer, or a similar type of device. In some implementations, media processing device 230 may receive user reaction information and media content associated with the user reaction information. Media processing device 230 may link the user reaction information and the media content to create linked content. Media processing device 230 may provide the linked content (e.g., to one or more user devices) for playback.

Activity monitoring device 240 may include one or more devices capable of receiving, generating, storing, processing, and/or providing one or more interest level indicators that indicate interest level(s) associated with one or more segments of media content. For example, activity monitoring device 240 may include a server device (e.g., a media server, an application server, a web server, etc.), a desktop computer, or a similar type of device. Activity monitoring device 240 may receive activity information associated with a segment of media content. In some implementations, the activity information may include user reaction information associated with the segment of media content, and/or may include other information associated with user interactions with the segment of media content.

In some implementations, activity monitoring device 240 may aggregate and/or analyze activity information (e.g., associated with multiple users, multiple user interactions, etc.) to determine one or more interest levels corresponding to one or more segments of media content. Activity monitoring device 240 may provide one or more interest level indictors that indicate interest level(s) associated with one or more segments of media content. For example, activity monitoring device 240 may provide the interest level indicator(s) to a user device (e.g., a desktop computer, a laptop computer, a tablet computer, a mobile phone, or a similar type of device) that requests the media content. The user device may use the interest level indicator(s) to present information that indicated an interest level associated with different segments of the media content. For example, the user device may provide an interest level indicator via a playback control bad associated with the media content.

Network 250 may include one or more wire and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
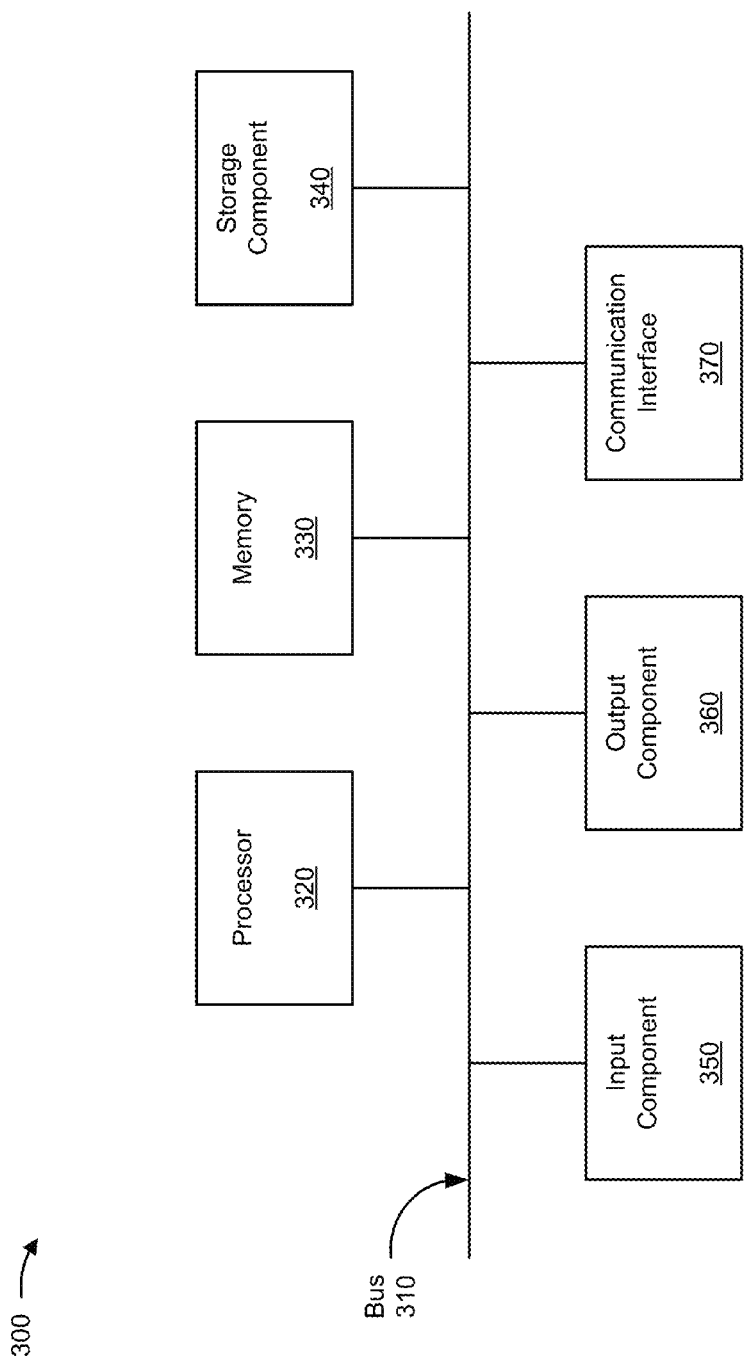
FIG. 3 is a diagram of example components of one or more devices of FIG. 2.

FIG. 3 is a diagram of example components of a device 300. Device 300 may correspond to media playback device 210, reaction monitoring device 220, media processing device 230, and/or activity monitoring device 240. In some implementations, media playback device 210, reaction monitoring device 220, media processing device 230, and/or activity monitoring device 240 may include one or more devices 300 and/or one or more components of device 300. As shown in FIG. 3, device 300 may include a bus 310, a processor 320, a memory 330, a storage component 340, an input component 350, an output component 360 and a communication interface 370.

Bus 310 may include a component that permits communication among the components of device 300. Processor 320 is implemented in hardware, firmware or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FGPS), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disk (CD), a digital versatile disk (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

Figure 4:
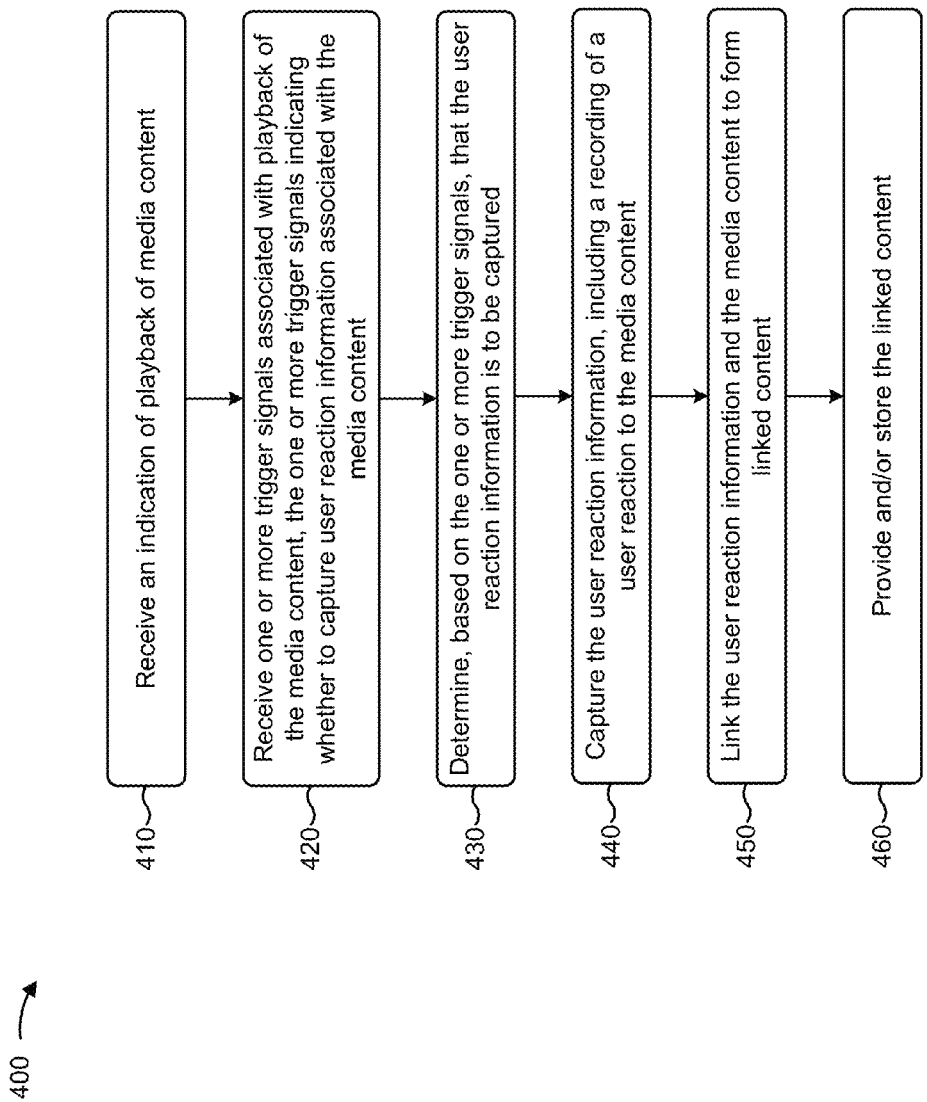
FIG. 4 is a flow chart of an example process for capturing a user reaction to media content based on a trigger signal.

FIG. 4 is a flow chart of an example process 400 for capturing a user reaction to media content based on a trigger signal. In some implementations, one or more process blocks of FIG. 4 may be performed by reaction monitoring device 220. In some implementations, one or more process blocks of FIG. 4 may be performed by another device or a set of devices separate from or including reaction monitoring device 220, such as media playback device 210, media processing device 230, and/or activity monitoring device 240.

As shown in FIG. 4, process 400 may include receiving an indication of playback of media content (block 410). For example, reaction monitoring device 220 may receive an indication that media content is being presented (e.g., played, displayed, output, provided for display, provided for output, etc.). Media content may refer to, for example, video content, audio content, textual content, some combination thereof, or the like. As an example, media content may include a video that includes visual content and audio content, such as a movie, a video clip, a television broadcast, or the like. As another example, media content may include audio, such as a song, a radio broadcast, an audio clip, or the like.

In some implementations, the media content may be presented via reaction monitoring device 220, such as by an output component of reaction monitoring device 220 (e.g., a display, a speaker, etc.). In this case, reaction monitoring device 220 may receive an indication that the media content is being presented by reaction monitoring device 220. In some implementations, the media content may be presented via a device other than reaction monitoring device 220, such as media playback device 210. In this case, reaction monitoring device 220 may receive an indication, from media playback device 210, that the media content is being presented by media playback device 210.

As further shown in FIG. 4, process 400 may include receiving one or more trigger signals associated with the playback of the media content, the one or more trigger signals indicating when to capture user reaction information associated with the media content (block 420), and determining, based on the one or more trigger signals, that the user reaction information is to be captured (block 430). For example, reaction monitoring device 220 may receive one or more trigger signals that indicate when to capture user reaction information associated with the media content. In some implementations, a user may view the media content, and may react to the media content. For example, the user may react to a sporting event being broadcast as media content, may react to a scene in a movie or a television show, may react to an audio clip or a video clip, or the like. The user may wish to capture the user's reaction, as user reaction information, when the user is viewing and/or listening to the media content. Reaction monitoring device 220 may use the trigger signal(s) to determine when to capture the user reaction information.

In some implementations, reaction monitoring device 220 may receive a trigger signal based on input provided to reaction monitoring device 220 (e.g., input provided by a user). Additionally or alternatively, reaction monitoring device 220 may receive a trigger signal based on detecting the trigger signal using one or more components of reaction monitoring device 220 (e.g., an audio capture component, a video capture component, an image capture component, etc.). Additionally or alternatively, reaction monitoring device 220 may receive a trigger signal from another device, such as media playback device 210.

In some implementations, a trigger signal may include explicit user input to capture the user reaction information (e.g., a recording of the user, such as a video recording, an audio recording, etc.). For example, a user of reaction monitoring device 220 may interact with reaction monitoring device 220 to provide a trigger signal, such as by interacting with an input mechanism (e.g., a "record" button) that causes reaction monitoring device 220 to capture video, audio, an image, or the like. As another example, reaction monitoring device 220 may determine that the media content is being presented, and may begin recording. At any point during the recording or after reaction monitoring device 220 has finished recording, reaction monitoring device 220 may receive user input that identifies the recording or a segment of the recording as user input information to be captured and/or stored.

In some implementations, a trigger signal may explicitly identify a segment of media content during which the user reaction information is to be captured. A segment of media content may refer to a portion of the media content, such as a portion that begins at a start time and ends at a stop time. As an example, reaction monitoring device 220 may receive user input of a segment identifier that identifies a start time and/or a stop time, of the media content, between which the user reaction information is to be captured. The user that inputs the segment identifier may include, for example, a user of reaction monitoring device 220, a content creator that created the media content, a content provider that provides the media content, another user who has previously viewed the media content and/or who has shared the media content (e.g., with a user of reaction monitoring device 220), or the like. In some implementations, a user may input the segment identifier (e.g., using a device associated with the user), and the segment identifier may be provided to reaction monitoring device 220. Reaction monitoring device 220 may receive the segment identifier, which may identify a segment of the media content. During playback of the media content, reaction monitoring device 220 may automatically capture user reaction information during a time period when the segment of the med content is playing (e.g., being presented).

In some implementations, reaction monitoring device 220 may determine a trigger signal based on processing the media content. For example, the trigger signal may be based on a type of the media content, a volume level of the media content, a frequency of sound included in the media content, a rate of change of content across frames of the media content, or the like. In some implementations, reaction monitoring device 220 may process the media content to determine the type, the volume level, the frequency, the rate of change, or the like. Additionally, or alternatively, reaction monitoring device 220 may receive information, from another device (e.g., media playback device 210) that identifies the type, the volume level, the frequency, the rate of change, or the like.

As an example, reaction monitoring device 220 may determine a type of the media content (e.g., based on receiving information, based on analyzing a source from which the media content is received, etc.). The type of the media content may include, for example, a sporting event, a television show, a movie, an online video, a social media video, a music video, a song, a radio show, or the like. Reaction monitoring device 220 may determine to capture the user reaction information when the media content is of a particular type.

As another example, reaction monitoring device 220 may determine a volume level of the media content. The volume level may include an absolute volume or a relative volume compared to an average volume level of the media content. When the volume level satisfies a threshold, reaction monitoring device 220 may determine to capture the user reaction information. For example, a loud noise in the media content may startle the user, and reaction monitoring device 220 may capture the startled reaction of the user. As another example, when the rate of change of the volume level satisfies a threshold, reaction monitoring device 220 may determine to capture the user reaction information. For example, a sudden change in the volume level of the media content may startle the user, and reaction monitoring device 220 may capture the startled reaction of the user.

As another example, reaction monitoring device 220 may determine a frequency of sound in the media content. When the frequency satisfies a threshold, reaction monitoring device 220 may determine to capture the user reaction information. For example, an actor in a movie may scream, and the scream may be within a particular frequency range. This may cause the user to scream, and reaction monitoring device 220 may capture the user's reaction, including the users screaming.

As another example, reaction monitoring device 220 may determine a rate of change of content (e.g., image content) across frames of the media content. When the rate of change of content satisfies a threshold, reaction monitoring device 220 may determine to capture the user reaction information. For example, a sudden movement in a video (e.g., with a rate of change, of frame content, that satisfies a threshold) may startle the user. Reaction monitoring device 220 may capture the user's startled reaction.

Additionally, or alternatively, reaction monitoring device 220 may determine a trigger signal based on processing captured information. In this case, reaction monitoring device 220 may capture information (e.g., a recording, a measurement, etc.) from an environment in which reaction monitoring device 220 is located. For example, the trigger signal may be based on a volume level of the captured information, a frequency of sound included in the captured information, a rate of change of content across frames of the captured information, facial recognition information associated with the captured information, or the like. Reaction monitoring device 220 may process the captured information to determine the volume level, the frequency, the rate of change, the facial recognition information, or the like.

As another example, reaction monitoring device 220 may determine a volume level of the captured information. In this case, the captured information may include an audio recording, which may be captured via a microphone of reaction monitoring device 220. The volume level may include an absolute volume or a relative volume compared to an average volume level of the captured information. When the volume level satisfies a threshold, reaction monitoring device 220 may determine to capture the user reaction information. For example, the user may scream, shout, cheer, etc., which may cause a captured volume level to satisfy a threshold. Reaction monitoring device 220 may capture the reaction of the user based on the volume level. Similarly, when the rate of change of the volume level of the captured information satisfies a threshold, reaction monitoring device 220 may determine to capture the user reaction information.

As another example, reaction monitoring device 220 may determine a frequency of sound in the captured information. In this case, the captured information may include an audio recording, which may be captured via a microphone of reaction monitoring device 220. When the frequency satisfies a threshold, reaction monitoring device 220 may determine to capture the user reaction information. For example, a user may scream, and the scream may be within a particular frequency range. Reaction monitoring device 220 may capture the reaction of the user based on the frequency of noise satisfying threshold (e.g., being greater than a threshold frequency, less than a threshold frequency, within a particular frequency range, etc.).

As another example, reaction monitoring device 220 may determine a rate of change of content (e.g., image content) across frames of the captured information. In this case, the captured information may include a video recording, which may be captured via a video recorder of reaction monitoring device 220. When the rate of change of content satisfies a threshold, reaction monitoring device 220 may determine to capture the user reaction information. For example, a sudden movement in a captured video (e.g., with a rate of change, of frame content, that satisfies a threshold) may indicate that the user has jumped out of the user's seat, is jumping around, is running around, or the like. Reaction monitoring device 220 may capture the user's reaction.

As another example, reaction monitoring device 220 may process captured information to determine facial recognition information. In this case, the captured information may include a video recording that includes a user's face, an image that includes the user's face, or the like. Reaction monitoring device 220 may analyze the captured information to determine facial recognition information, such as a type of emotion represented by the user's facial expression (e.g., happy, sad, angry, surprised, scared, etc). Reaction monitoring device 220 may determine to capture the user reaction information when the facial recognition information indicates that the user's facial expression indicates a particular type of emotion (e.g., surprised, scared, etc). Additionally, or alternatively, the facial recognition information may indicate a change in the user's emotion (e.g., from neutral to surprised, from sad to happy, etc). Reaction monitoring device 220 may determine to capture the user reaction information when the facial recognition information indicates that the user's emotion has changed.

Additionally or alternatively, reaction monitoring device 220 may determine a trigger signal based on an environmental factor independent of the media content, independent of captured information (e.g., a captured recording), or the like. For example, the trigger signal may be based on a geographical location of reaction monitoring device 220, a movement detected by reaction monitoring device 220, a date, a time, a day of the week, or the like. In some implementations, reaction monitoring device 220 may determine the geographical location, the movement, the date, the time, the day of the week, or the like, using a component of reaction monitoring device 220. Additionally, or alternatively, reaction monitoring device 220 may receive information, from another device (e.g., media playback device 210) that identifies the geographical location, the movement, the date, the time, the day of the week, or the like.

As an example, reaction monitoring device 220 may determine a geographical location of reaction monitoring device 220. When reaction monitoring device 220 is located in a particular geographical location, reaction monitoring device 220 may determine to capture the user reaction information. For example, the user and reaction monitoring device 220 may be located in a sporting arena, a movie theater, at the user's home (e.g., in front of a television), at a concert venue, or the like. The user may be more likely to have a reaction to be captured in these geographical locations, and reaction monitoring device 220 may capture the user's reaction based on the geographical location of reaction monitoring device 220.

As another example, reaction monitoring device 220 may determine a movement associated with reaction monitoring device 220. In this case, the movement may be a velocity of reaction monitoring device 220, an acceleration of reaction monitoring device 220, a deceleration of reaction monitoring device 220, or the like, and reaction monitoring device 220 may capture the movement using a component of reaction monitoring derive 220 (e.g., a speedometer, an accelerometer, etc.). When the velocity, acceleration, etc. of reaction monitoring device 220 satisfies a threshold, reaction monitoring device 220 may determine to capture the user reaction information. For example, the user may be holding reaction monitoring device 220 (e.g., a mobile phone), and the user may throw the users hands in the air when the user's favorite team scores, causing reaction monitoring device 220 to accelerate. In this case, reaction monitoring device 220 may capture the user's reaction based on the acceleration satisfying the threshold.

As another example, reaction monitoring device 220 may determine a current date, time, day of the week, or the like. When reaction monitoring device 220 determines a particular date, a particular time, a particular day of the week, or the like, reaction monitoring device 220 may determine to capture the user reaction information. For example, reaction monitoring device 220 may capture the user reaction information at a particular date and time (e.g., from 6 pm-9 pm on Super Bowl Sunday), at a particular time on a particular day of the week (e.g., during the user's favorite television show), or the like.

In some implementations, reaction monitoring device 220 may use a single trigger signal, described herein, to determine when to capture the user reaction information. In some implementations, reaction monitoring device 220 may use multiple trigger signals, described herein, to determine when to capture the user reaction information. For example, multiple trigger signals, in combination, may trigger reaction monitoring device 220 to begin capturing user reaction information (e.g., a particular location and a volume level that satisfies a threshold).

In some implementations, reaction monitoring device 220 may determine to capture user reaction information when multiple trigger signals satisfy a threshold (e.g., the same threshold or different thresholds). Additionally or alternatively, reaction monitoring device 220 may calculate a score based on one or more trigger signals such as by determining whether the one or more trigger signals satisfy one or more thresholds, and applying one or more weights to calculate the score based on whether the one or moiré trigger signals satisfy the one or more thresholds. When the score satisfies a threshold, reaction monitoring device 220 may determine to capture the user reaction information.

As further shown in FIG. 4, process 400 may include capturing the user reaction information, including a recording of a user reaction to the media content (block 440). For example, reaction monitoring device 220 may capture the user reaction information based on one or more trigger signals, as described above. The user reaction information may include a recording captured by reaction monitoring device 220. For example, reaction monitoring device 220 may capture a video recording (e.g., using a video recording component), an audio recording (e.g., using an audio recording component), an image (e.g., using an image capture component), or the like. In some implementations, the recording may capture a user and/or a user reaction to media content. Additionally, or alternatively, the recording may capture multiple users, an animal, an object, or the like (e.g., based on what is captured by reaction monitoring device 220).

In some implementations, reaction monitoring device 220 may begin recording user reaction information when one or more trigger signals are detected or received, as described above. In some implementations, reaction monitoring device 220 may record user reaction information without detecting or receiving one or more trigger signals, and may store the user reaction information in a buffer (e.g., may obtain buffered user reaction information, and may separately store the buffered user reaction information in a memory other than the buffer). When the one or more trigger signals are detected or received, reaction monitoring device 220 may obtain user reaction information from the buffer. In some implementations, reaction monitoring device 220 may obtain all of the user reaction information included in the buffer (e.g., where the buffer stores a particular amount of information, stores a particular segment of captures user reaction information, etc.). In some implementations, reaction monitoring device 220 may obtain a portion of user reaction information included in the buffer (e.g., a particular segment, such as the most recent five seconds). Additionally, or alternatively, reaction monitoring device 220 may obtain first user reaction information, stored in the buffer, and may record second user reaction information, not stored in the buffer, when reaction monitoring device 220 detects or receives one or more trigger signals.

In some implementations, reaction monitoring device 220 may record the user reaction information for a particular amount of time (e.g., a user-defined amount of time, a default amount of time, etc.). Additionally, or alternatively, reaction monitoring device 220 may record the user reaction information until one or more other trigger signals are detected or received (e.g., similar to the trigger signal(s) described above in connection with block 430). Additionally, or alternatively, reaction monitoring device 220 may record the user reaction information until reaction monitoring device 220 receives user input indicating to stop capturing the user reaction information.

In some implementations, reaction monitoring device 220 may permit a user to edit the user reaction information. For example, reaction monitoring device 220 may present the user reaction information (e.g., audio, video, etc.), and may permit the user to modify the user reaction information. In some implementations, the user may modify the user reaction information, to form modified user reaction information, by indicating a start time and an end time for the user reaction information (e.g., a segment).

In some implementations, reaction monitoring device 220 may add information to the recording to form the user reaction information. For example, reaction monitoring device 220 may include a user identifier in the user reaction information (e.g., a username, a user avatar, etc.), or the like.

By capturing a short segment of user reaction information based on one or more trigger signals, reaction monitoring device 220 may conserve computing resources that would otherwise be consumed to record a long segment of user reaction information, and then modifying the long segment to form the short segment. Furthermore, reaction monitoring device 220 may capture a user reaction that may otherwise not be captured if the trigger signal(s) are not used to determine when to capture the user reaction. In some implementations, the user may interact with reaction monitoring device 220 to share the user reaction information, as described below.

As further shown in FIG. 4, process 400 may include linking the user reaction information and the media content to form linked content (block 450). For example, reaction monitoring device 220 may link the captured user reaction information and the media content to form linked content, in some implementations. Additionally, or alternatively, reaction monitoring device 220 may provide the user reaction information to media processing device 230, and media processing device 230 may link the user reaction information and the media content to form linked content. While reaction monitoring device 220 is described herein as linking the user reaction information and the media content, in some implementations, media processing device 230 may link the user reaction information and the media content.

In some implementations, reaction monitoring device 220 may identify the media content to which the captured user reaction information is to be linked. For example, reaction monitoring device 220 may identify media content that was being presented (e.g., that was playing) when the user reaction information was being captured. As another example, reaction monitoring device 220 may identify media content that triggered the user reaction information to be captured (e.g., reaction monitoring device 220 determined to capture the user reaction information based on processing the media content).

Similarly, reaction monitoring device 220 may identify a segment of media content to which the captured user reaction information is to be linked. For example, reaction monitoring device 220 may identify a segment of media content that was being presented (e.g., that was playing) when the user reaction information was captured. In this case, reaction monitoring device 220 may determine a start time for the segment corresponding to a time when reaction monitoring device 220 began capturing the user reaction information. Similarly, reaction monitoring device 220 may determine a stop time for the segment corresponding to a time when reaction monitoring device 220 stopped capturing the user reaction information. As another example, reaction monitoring device 220 may identify a segment of media content that triggered the user reaction information to be captured (e.g., reaction monitoring device 220 determined to capture the user reaction information based on processing the segment of media content).

In some cases, reaction monitoring device 220 may receive user input to modify a segment of captured user reaction information (e.g., a start time, a stop time). In this case, reaction monitoring device 220 may identify a segment of the media content that corresponds to the edited segment of user reaction information. In this way, reaction monitoring device 220 may synchronize the media content and the recording of the user reaction such that when both are played simultaneously, a moment in the recording corresponds to a moment in the media content that was playing at the moment the recording was captured.

As an example, assume that reaction monitoring device 220 starts capturing user reaction information 10 seconds into a video, and stops capturing user reaction information 25 seconds into the video. In this case, reaction monitoring device 220 may link the user reaction information to the video, and/or may link the user reaction information to a segment of the video from 10 seconds to 25 seconds. In this way, when the video and the recording of the user reaction information are presented concurrently, the reaction to the video from 10 seconds to 25 seconds may be viewed alongside the actual video from 10 seconds to 25 seconds.

In some implementations, reaction monitoring device 220 may link the user reaction information and the media content by storing, in a data structure, information that identifies the user reaction information, information that identifies the media content, and a relationship indicator that indicates a relationship between the user reaction information and the media content. Additionally, or alternatively, reaction monitoring device 220 may store information that identifies a segment of the media content to which the user reaction information corresponds (e.g., a segment during which the user reaction information was captured). Additionally, or alternatively, reaction monitoring device 220 may store the user reaction information and/or the media content in the data structure.

In some implementations, reaction monitoring device 220 may link the captured user reaction information and the media content by separately storing a recording of the user reaction information and the media content, and by storing a relationship indicator that indicates the link. In this way, reaction monitoring device 220 may form linked content that includes the captured user reaction information and media content. Additionally, or alternatively, a reaction monitoring device 220 may form the linked content by combining the captured user reaction information and the media content into a single item of media content (e.g., a single video clip, a single audio clip, etc.). The single item of media content may permit the media content and the captured user reaction to the video content to be synchronized and viewed concurrently. In some cases, the media content and the captured user reaction may be presented side-by-side. In some implementations, the captured user reaction may be superimposed on the media content. In some implementations, the media content may be superimposed on the captured user reaction.

Additionally, or alternatively, reaction monitoring device 220 may capture additional user reaction information (e.g., from the same user, from different users, etc.), and may combine the additional user reaction information with the linked content to form additional linked content. In this way, multiple user reactions to a single item of media content may be synchronized and displayed concurrently.

As further shown in FIG. 4, process 40 may include providing and/or storing the linked content (block 460). For example, reaction monitoring device 220 may provide the linked content to media processing device 230 (e.g., for storage, for processing, for providing to one or more user devices, etc.). Additionally, or alternatively, reaction monitoring device 220 may store the linked content locally.

In some implementations, reaction monitoring device 220 may provide the linked content to media processing device 230, or media processing device 230 may generate the linked content based on receiving the user reaction information and the media content. Media processing device 230 may receive a request for the linked content from a user device. In this case, media processing device 230 may provide the linked content to the user device (e.g., based on the request). Media processing device 230 may provide the linked content as a single item of content, may provide the linked content as multiple items of content with instructions to synchronize playback, or the like. In this way, media processing device 230 may share a user's reaction to media content with the other users.

In some implementations, reaction monitoring device 220 may provide the user reaction information, the media content, and/or the linked content to activity monitoring device 240 as activity information, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of capturing a user reaction to media content based on a trigger signal.

Figure 5A:
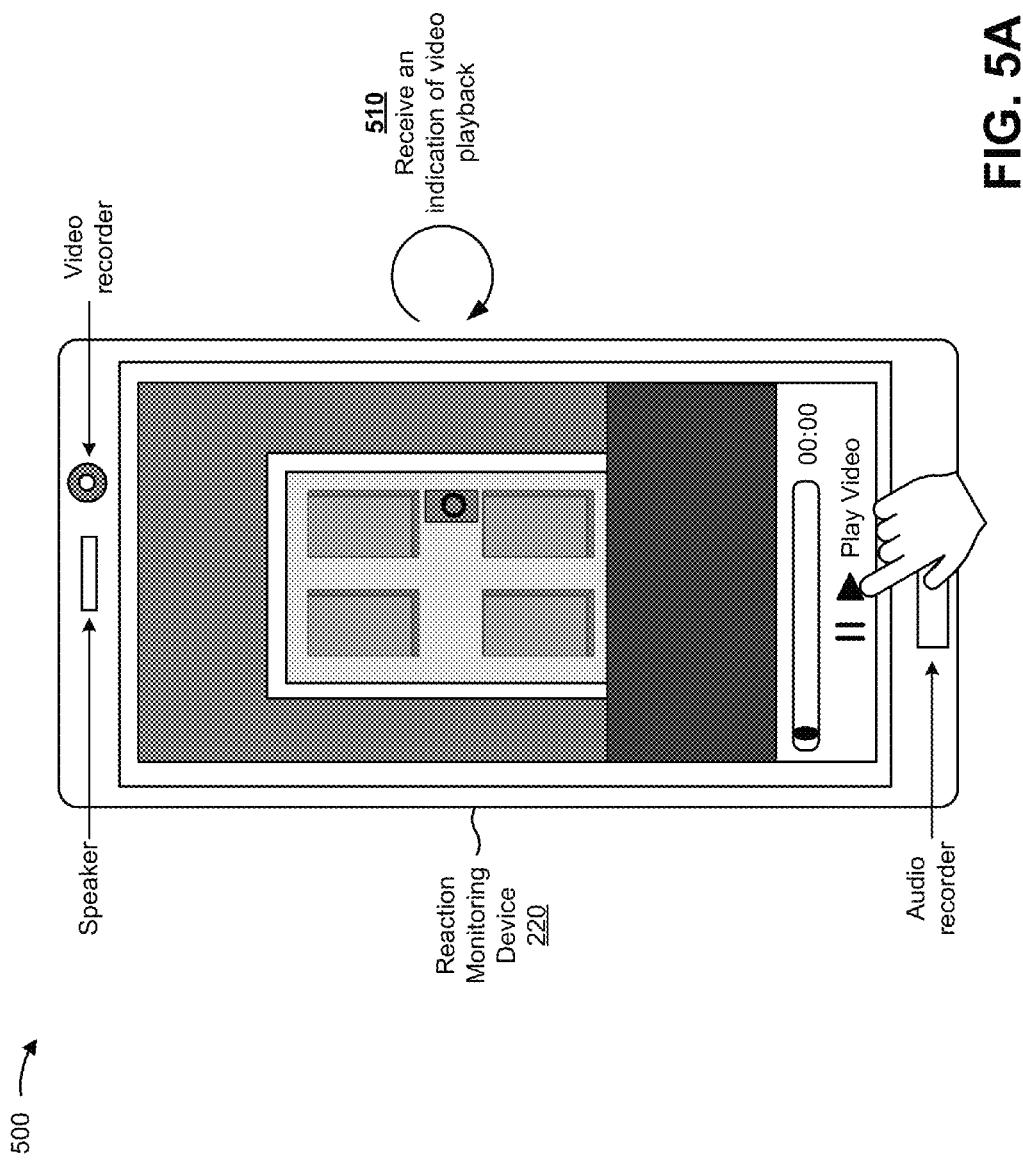
FIGS. 5A-5D are diagrams of an example implementation relating to the example process shown in FIG. 4.

As shown in FIG. 5A, assume that reaction monitoring device 220 includes a mobile phone with a speaker, a video recorder, and an audio recorder. As shown by reference number 510, assume that reaction monitoring device 220 receives an indication of video playback. Assume that the video is a scary video with a ghost that appears when a door is suddenly opened. As shown, assume that the video begins with the door closed.

Figure 5B:
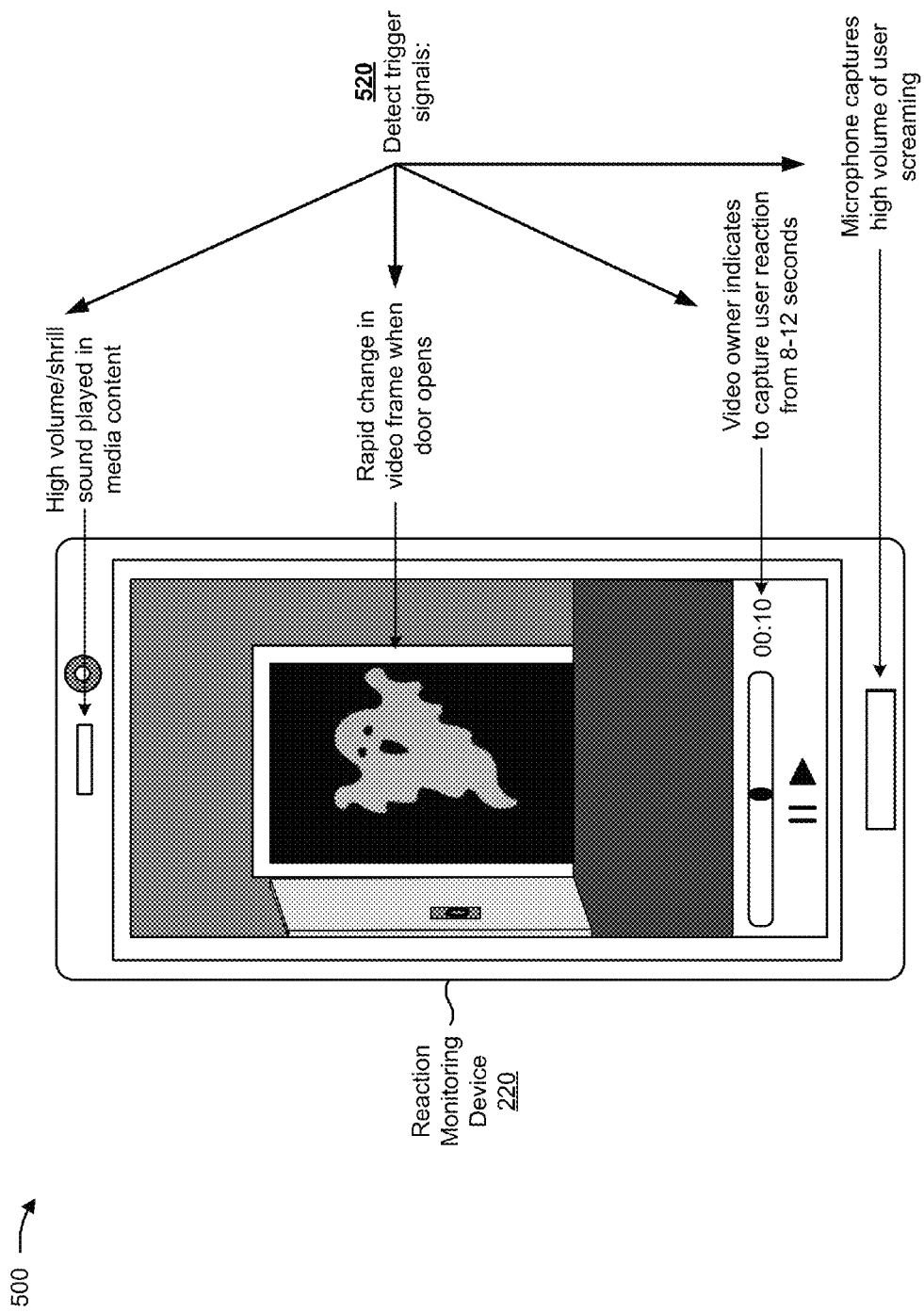

As shown in FIG. 5B, assume that reaction monitoring device 220 plays the video, and that the ghost appears when the door is opened 10 seconds into the video. As shown by reference number 520, assume that reaction monitoring device 220 detects one or more trigger signals to indicate that user reaction information is to be captured. As an example, the video may include a loud noise as the door bangs open, or maybe include a shrill sound, and reaction monitoring device 220 may process the video (or the audio in the video) to detect these trigger signals. As another example, there may be a rapid change in content between video frames when the door opens, and reaction monitoring device 220 may process the video to detect this trigger signal. As another example, an owner of the video may indicate that user reaction information is to be captured from 8 seconds to 12 seconds of the video. As another example, reaction monitoring device 220 may capture a scream form the user using a microphone of reaction monitoring device 220. Reaction monitoring device 220 may use one or more of these trigger signals to determine that user reaction information is to be captured during a segment of the video from 8 seconds to 12 seconds. In some implementations, the user may opt in to give permission for the user reaction information to be captured.

Figure 5C:
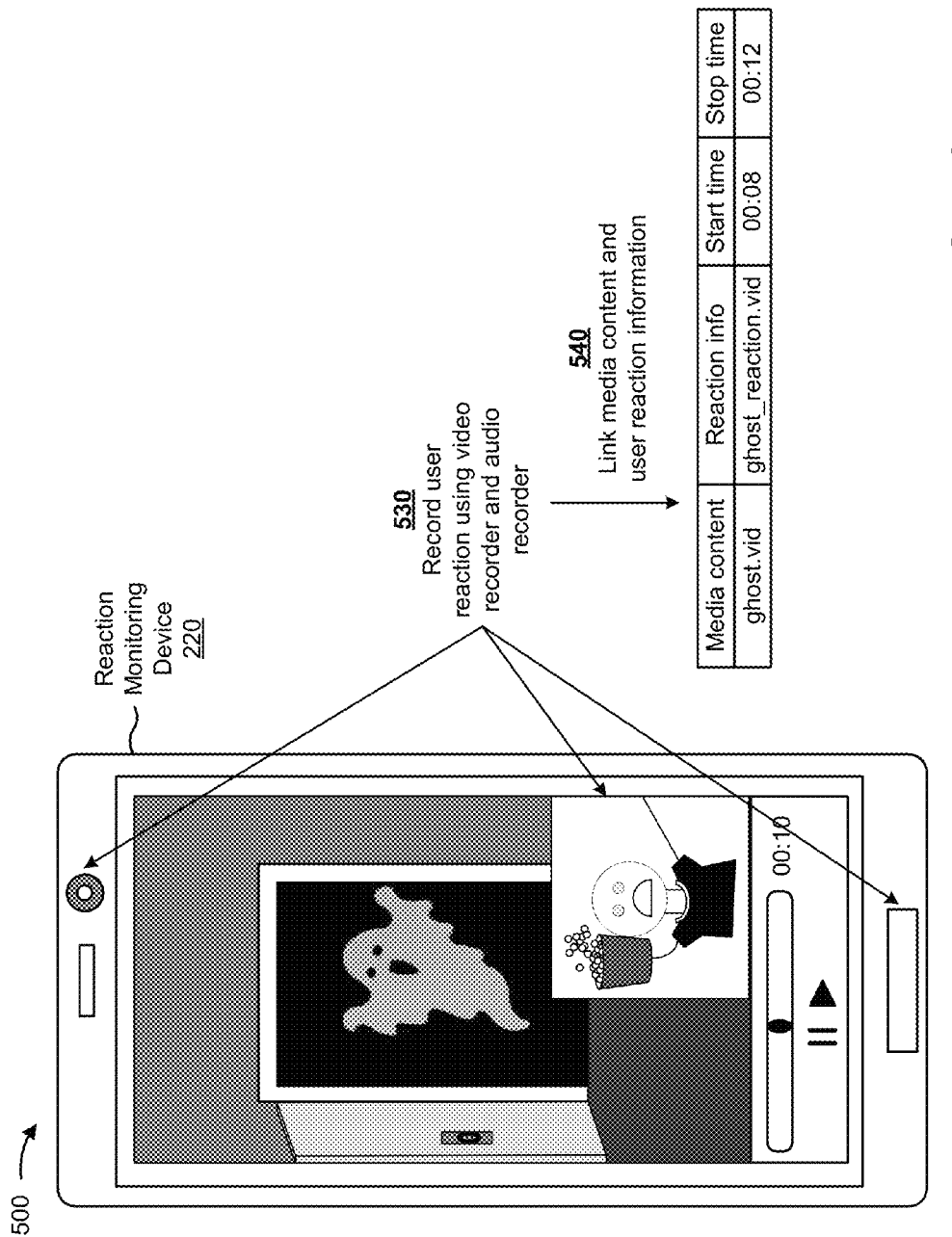

As shown in FIG. 5C, and by reference number 530, assume that reaction monitoring device 220 captures the user reaction to the video segment using a video recorder and an audio recorder of reaction monitoring device 220. As shown by reference number 540, assume that reaction monitoring device 220 links the video and the captured user reaction information. As shown, reaction monitoring device 220 may use a data structure to indicate a link between the video, the user reaction information, and a segment of the video to which the user reaction information corresponds. Assume that reaction monitoring device 220 stores the video and the user reaction information as linked content.

Figure 5D:
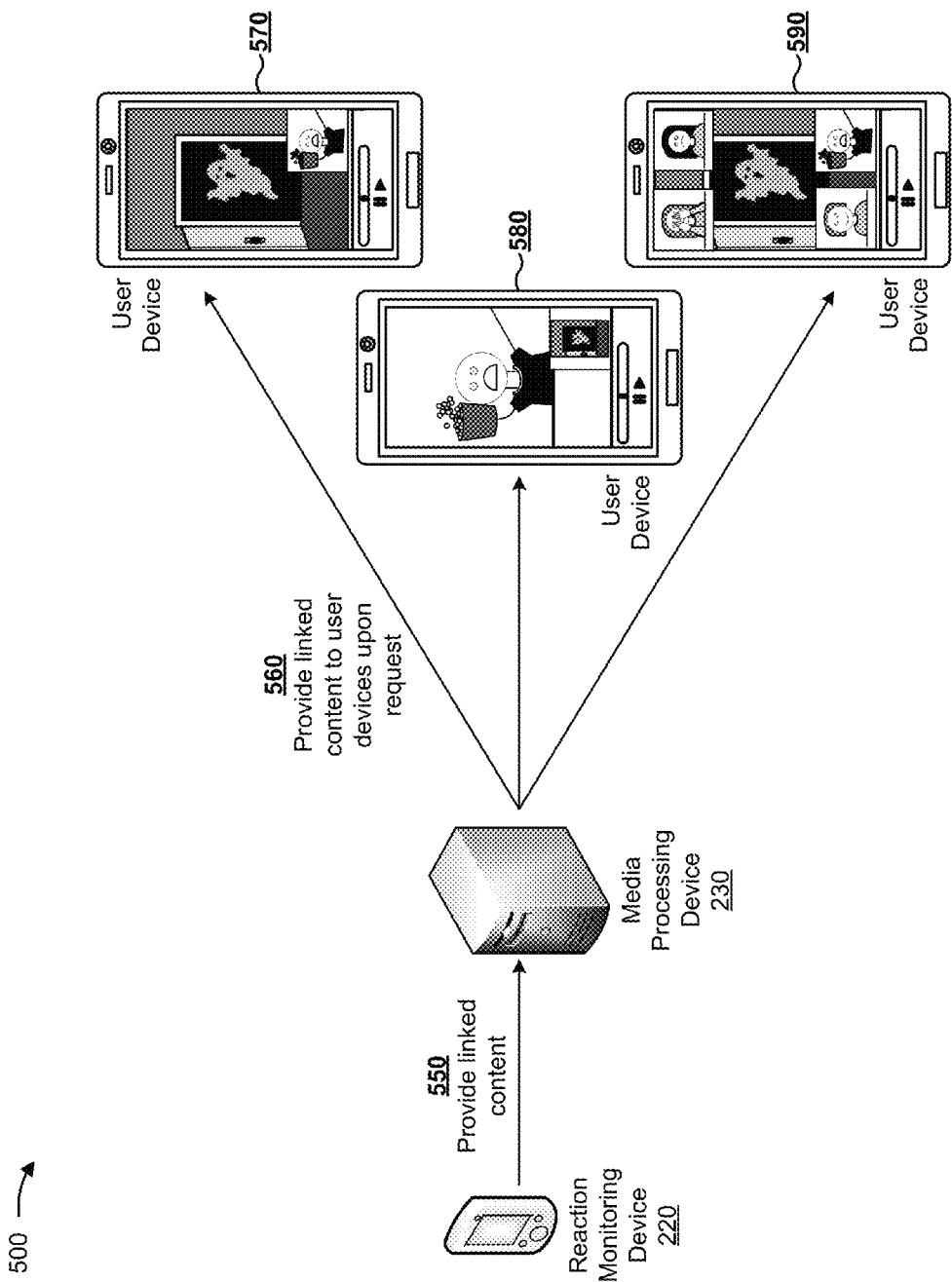

As shown in FIG. 5D, and by reference number 550, assume that reaction monitoring device 220 provides the linked content to media processing device 230. As shown by reference number 560, media processing device 230 may provide the linked content to one or more user devices upon request. As shown by reference number 570, the linked content may be provided with an instruction to provide the video in a large window and the user reaction information in a smaller window. As shown by reference number 580, the linked content may be provided with an instruction to provide the video in a small window and the user reaction information in a large window. As shown by reference number 590, the linked content may be provided with an instruction to provide the video along with multiple user reactions included in different user reaction information. In some implementations, the user may interact with the linked content to provide the media content and/or the user reaction information in different manners. In this way, a user may share the user's reaction to media content with other users.

As indicated above, FIGS. 5A-5D are provided merely as an example. Other examples are possible and may differ from what was described with regard to FIGS. 5A-5D.

FIG. 6 is a flow chart of an example process 600 for providing an interest level indicator, associated with a segment of media content, via a playback bar associated with the media content. In some implementations, one or more process blocks of FIG. 6 may be performed by activity monitoring device 240. In some implementations, one or more process blocks of FIG. 6 may be performed by another device or a set of devices separate from or including activity monitoring device 240, such as media playback device 210, reaction monitoring device 220, and/or media processing device 230.

As shown in FIG. 6, process 600 may include receiving activity information, including user reaction information, associated with a segment of media content (block 610). For example, activity monitoring device 240 may receive activity information from one or more user devices, from reaction monitoring device 220, from media processing device 230, or the like. Activity information may include information that indicates a user interaction with a segment of media content. For example, the activity information may include user reaction information associated with a segment of media content, as described elsewhere herein. In some implementations, reaction monitoring device 220 may capture user reaction information, and may provide the use reaction information to activity monitoring device 240 as activity information.

Additionally, or alternatively, activity information may include an indication that a user interacted with a user device to request the segment of media content, to access the segment of media content, to play the segment of media content, or the like. Additionally, or alternatively, activity information may include an indication that a user interacted with a user device to bookmark the segment of media content (e.g., to store a link to the segment of media content), to share the segment of media content (e.g., with other users and/or user devices), to comment on the segment of media content (e.g., to indicate a positive comment or a negative comment), to perform a social media action in association with the segment of media content, or the like.

Additionally, or alternatively, the activity information may include an indication that a user rewound the media content to cause the segment of the media content to be played again, fast-forwarded the media content to skip the segment of media content, or the like. Additionally, or alternatively, the activity information may include an indication that other content was created based on the segment of media content (e.g., user reaction information, linked content, etc.).

In some implementations, activity monitoring device 240 may process user reaction information, associated with a segment of media content, to generate activity information. For example, activity monitoring device 240 may use facial recognition information to determine a type of emotion (e.g., a positive emotion, such as happiness; a negative emotion, such as sadness), a strength of a user reaction (e.g., a strength of a positive reaction, a strength of a negative reaction, etc.), or the like, associated with the segment of media content. In this case, activity monitoring device 240 may generate activity information that indicates the type of emotion, the strength of the reaction, or the like.

In some implementations, activity monitoring device 240 may receive and/or determine multiple types of activity information, which may include the types of activity information described above. Additionally, or alternatively, activity monitoring device 240 may receive one or more types of activity information for different segments of media content (e.g., multiple segments of the same media content).

As further shown in FIG. 6, process 600 may include aggregating and/or analyzing the activity information to determine an interest level associated with the segment of media content (block 620). For example, activity monitoring device 240 may analyze activity information to determine an interest level associated with one or more segments of media content. Additionally, or alternatively, activity monitoring device 240 may aggregate different types of activity information, which may be received from different user devices and/or which may be associated with different users. In this case, activity monitoring device 240 may analyze the aggregated activity information to determine an interest level associated with one or more segments of media content.

In some cases, activity information may indicate an increased interest level in a segment of media content (e.g., as compared to a neutral, or default, interest level). For example, activity information, that indicated one or more of the following activities, may indicate an increased interest level in a segment of media content: requesting the segment, accessing the segment, playing the segment, bookmarking the segment, sharing the segment, commenting on the segment (e.g., a positive comment), performing a social media action in association with the segment (e.g., "liking" the segment), rewinding the media content to cause the segment to be played again, creating other content based on the segment, a positive emotional reaction to the segment, a strong positive reaction to the segment, or the like.

In some cases, activity information may indicate a decreased interest level in a segment of media content (e.g., as compared to a neutral, or default, interest level). For example, activity information, that indicates one or more of the following activities, may indicate a decreased interest level in a segment of media content: commenting on a segment (e.g., a negative comment), fast-forwarding the media content to cause the segment to be skipped, a negative emotional reaction to the segment, a strong negative reaction to the segment, or the like.

In some implementations, activity monitoring device 240 may determine an interest level associated with a segment of media content based on one or more activity types identified above. For example, activity monitoring device 240 may assign an initial interest level indicator (e.g., zero) to a segment. Activity monitoring device 240 may increase the interest level indicator based on an activity, associated with the segment, that indicates an increased interest level in the segment (e.g., as identified above). Similarly, activity monitoring device 240 may decrease the interest level indicator based on an activity, associated with the segment, that indicates a decreased interest level in the segment (e.g., as identified above).

Additionally, or alternatively, activity monitoring device 240 may use one or more activities, identified in activity information, to calculate a score for the interest level indicator. For example, activity monitoring device 240 may calculate the score based on whether a type of activity occurred in association with a segment (e.g., whether any users bookmarked the segment), a quantity of times a type of activity occurred in association with a segment (e.g., a quantity of times the segment was skipped due to fast-forwarding), quantity of users that performed a type of activity in association with a segment (e.g., a quantity of users that commented on the segment), a quantity of different types of activities performed in association with the segment, a strength of a reaction to the segment, or the like.

In some implementations, activity monitoring device 240 may determine an interest level indicator for a segment of media content based on a relative interest level of the segment compared to other segments included in that media content. Additionally, or alternatively, activity monitoring device 240 may determine an interest level indicator for a segment of media content based on a relative interest level of the segment compared to other segments included in other media content.

As further shown in FIG. 6, process 600 may include providing an interest level indicator, associated with the segment of media content, based on the interest level associated with the segment of media content (block 630). For example, activity monitoring device 240 may provide one or more interest level indicators, corresponding to one or more segments of media content, to a user device that requests the media content. Additionally, or alternatively, activity monitoring device 240 may provide an instruction to provide an indication of the one or more interest level indicators in association with the one or more segments of media content.

As an example, activity monitoring device 240 may provide an interest level indicator to a user device, and may provide an instruction that indicates a manner in which the interest level indicator is to be presented via the user device (e.g., for display). For example, the instruction may indicate that the interest level indicator is to be provided via a playback bar (e.g., or other visual information). A playback bar may refer to a playback control mechanism or another type of user interface element that may control playback of media content, that may be used to skip to a particular segment of the media content, that may indicate a timeline of the media content, or the like. As another example, the instruction may indicate that the interest level indicator is to be provided for display via the playback bar to indicate a level of interest in a segment.

For example, a first portion of playback bar may be provided in a first color (e.g., green) to indicate a high level of interest, and a second portion of the playback bar may be provided in a second color (e.g., red) to indicate a low level of interest. As another example, a first portion of a playback bar may be provided using a first size (e.g., large) to indicate a high level of interest, and a second portion of the playback bar may be provided using a second size (e.g., small) to indicate a low level of interest. As another example, a first portion of a playback bar may be provided using a first brightness (e.g., bright) to indicate a high level of interest, and a second portion of the playback bar may be provided using a second brightness (e.g., dim) to indicate a low level of interest.

Additionally, or alternatively, the playback bar may be provided such that a segment associated with an interest level indicator that satisfies a threshold are provided in a different manner than segments associated with an interest level indicator that does not satisfy the threshold. Additionally, or alternatively, the instruction may indicate to provide multiple of the playback bars described herein. In this way, a user may easily identify interesting and/or uninteresting segments of media content.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
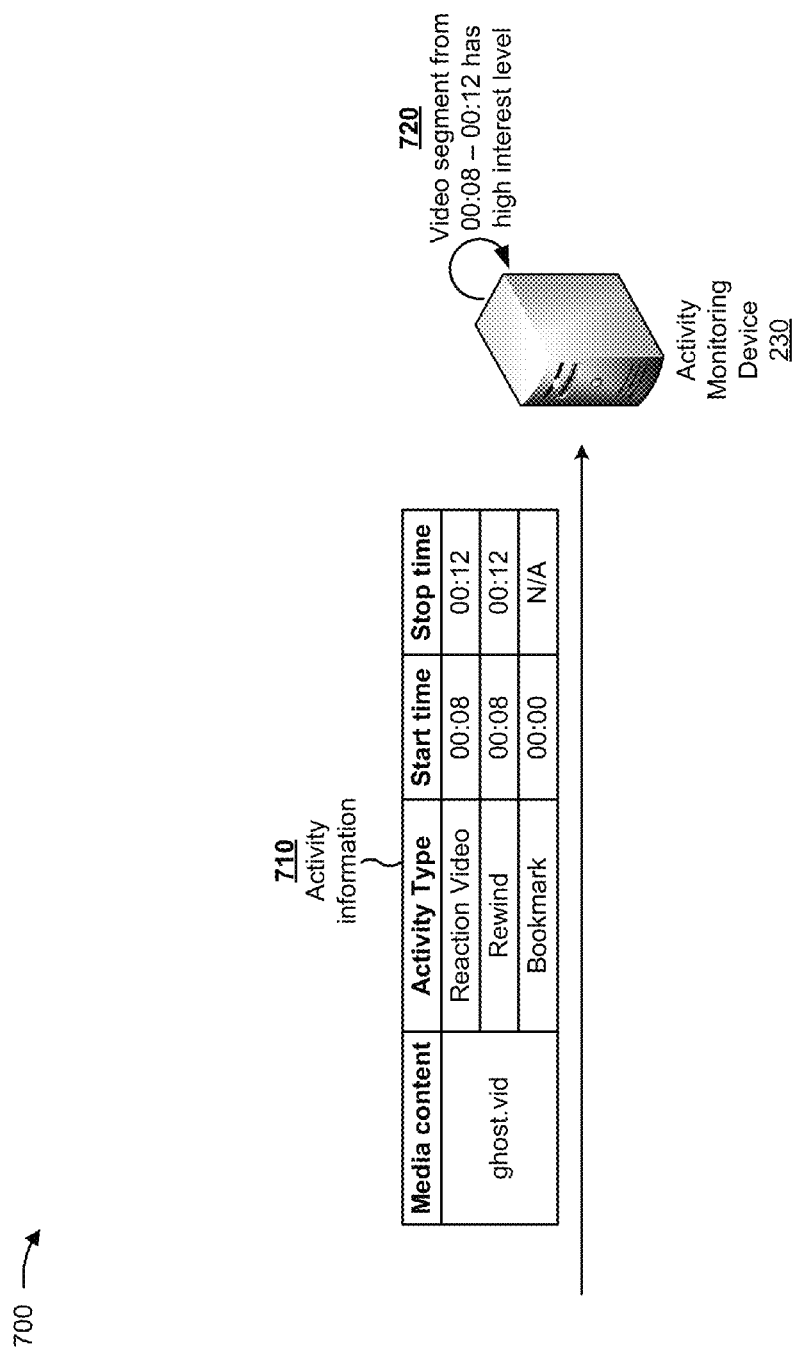
FIGS. 7A and 7B are diagrams of an example implementation relating to the example process shown in FIG. 6.
Figure 7B:
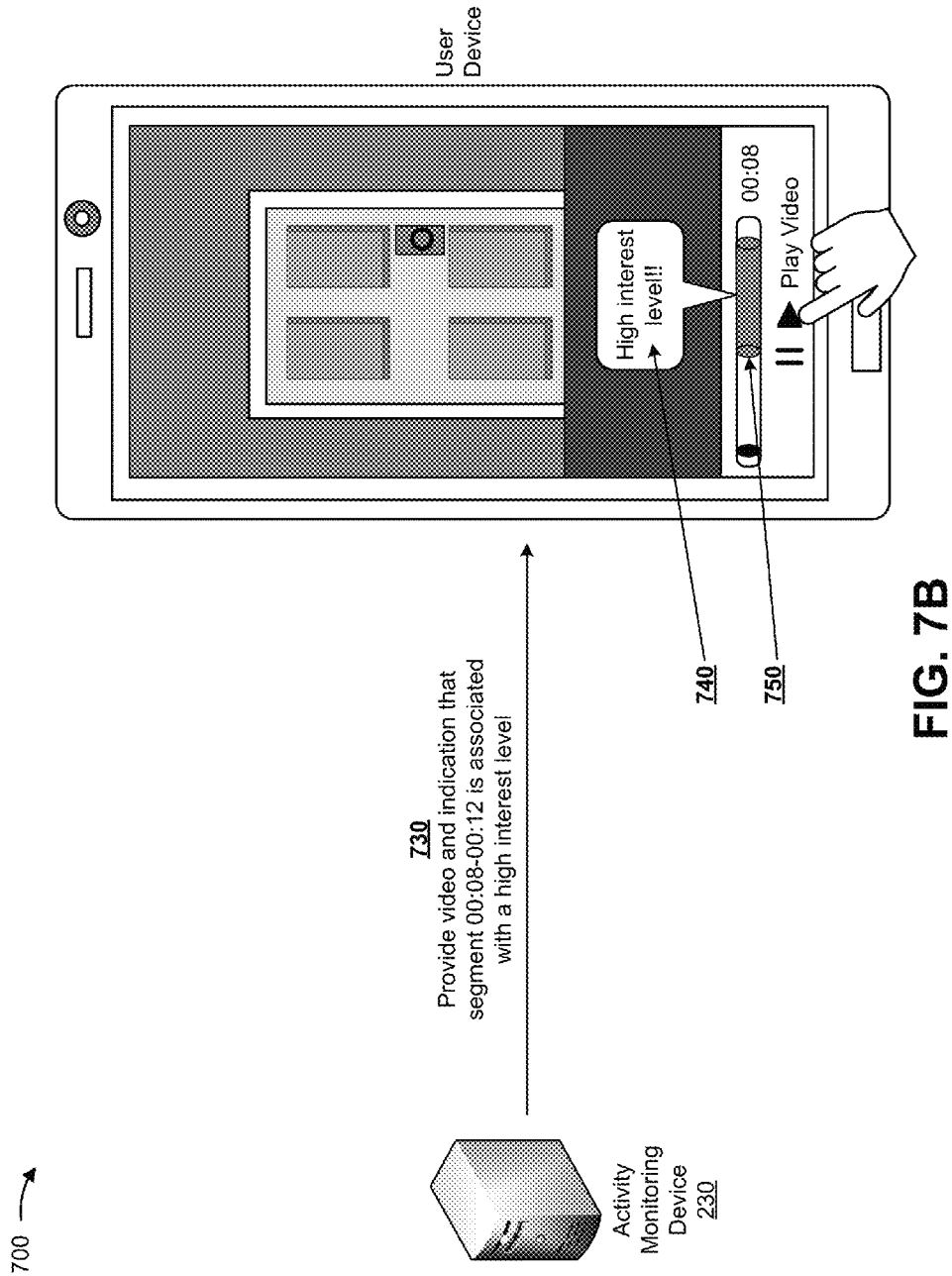

FIGS. 7A and 7B are diagrams of an example implementation 700 relating to example process 600 shown in FIG. 6. FIGS. 7A and 7B show an example of providing an interest level indicator, associated with a segment of media content, via a playback bar associated with the media content.

As shown in FIG. 7A, and by reference number 720, assume that activity monitoring device 240 receives activity information associated with a video identified as "ghost.vid" (e.g., as described in connection with FIGS. 5A-5D). Assume that the activity information indicates that a first user created a reaction video of user reaction information during a segment of the video from 8 seconds to 12 seconds (e.g., as described in connection with FIGS. 5A-5D). As further shown, assume that the activity information indicates that a second user rewound the video to replay the segment of the video from 8 seconds to 12 seconds. As further shown, assume that the activity information indicates that a third user bookmarked the video at the 8 second mark. Based on this activity information, assume that activity monitoring device 240 determines that the ghost.vid video is associated with a high interest level from 8 seconds to 12 seconds, as shown by reference number 720.

As shown in FIG. 7B, assume that a user device requests the video for ghost.vid from activity monitoring device 240. In some cases, a user device may request the video from media processing device 230. For example, activity monitoring device 240 may determine the activity information, and may provide the activity information to media processing device 230 to store in association with the video. For the purpose of FIG. 7B, assume that activity monitoring device 240 stores the activity information in association with the video.

As shown by reference number 730, assume that activity monitoring device 240 provides the video, and also provides an indication that the segment of the video from 8 seconds to 12 seconds is associated with a high interest level. Based on receiving this indication, assume that the user device provides, via a playback bar associated with the video, an indication that the segment from 8 seconds to 12 seconds is associated with a high interest level (e.g., higher than a default interest level, higher than an interest level associated with the remaining segments of the video, etc.).

For example, and as shown by reference number 740, assume that the user device provides text that indicates that the segment from 8 seconds to 12 seconds is associated with a high interest level. As another example, as shown by reference number 750, assume that the user device provides the playback bar in a different color on a portion of the playback bar corresponding to the segment of the video from 8 seconds to 12 seconds. This may permit the user to interact with the playback bar to skip ahead to the interested segment of the video, thereby conserving time and computing resources (e.g., by not playing the entire video, by not having to deliver the entire video, etc.).

As indicated above, FIGS. 7A and 7B are provided merely as an example. Other examples are possible and may differ from what was described with regard to FIGS. 7A and 7B.

Implementations described herein determine when to record a user's reaction to a segment of media content based on detecting one or more trigger signals. In this way, a device that captures the user's reaction may conserve computing resources and may save time for the user by automatically capturing a short segment of a user reaction, rather than requiring the user to capture a long segment and edit the long segment to include only the user's reaction. Furthermore, implementations described herein may assist in linking a user reaction with media content that cause the user reaction, and may assist in identifying an interest level of different segments of the media content based on user reactions and other activity information associated with the media content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the use interface, information provided via the user interface, a position of information provides via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of person information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used here should be constructed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
     receive an indication of a playback of media content;
     receive one or more trigger signals associated with the playback of the media content,
       the one or more trigger signals indicating a point, within the playback of the media content, to capture user reaction information associated with a segment of the media content;
     analyze the user reaction information to determine facial recognition information, the facial recognition information indicating at least one emotion of a user;
     determine, based on the one or more trigger signals and based on the facial recognition information indicating the at least one emotion of the user, that the user reaction information is to be captured,
       the user reaction information not being captured for irrelevant user reactions;
     capture the user reaction information, to form captured user reaction information, based on determining that the user reaction information is to be captured,
       the captured user reaction information including an audio recording or a video recording captured by the device;
     receive an interest level indicator that indicates an interest level associated with the segment of the media content,
       the interest level being determined by analyzing activity information associated with the segment of media content;
     provide information that identifies the interest level in association with presentation of the media content,
       the information that identifies the interest level being displayed as a playback bar,
         the playback bar indicating the interest level via visual information,
           the visual information including at least one of:
             text indicating the interest level, or
             a color indicating the interest level; and
     cause the captured user reaction information to be linked with the media content.

2. The device of claim 1, where the one or more processors are further to:
   determine the segment of the media content being played at the point when the user reaction information is being captured; and
   where the one or more processors, when causing the captured user reaction information to be linked with the media content, are to:
      cause the captured user reaction information to be linked with the segment of the media content.
3. The device of claim 1, where the one or more processors, when causing the captured user reaction information to be linked with the media content, are to:
   cause the captured user reaction information to be linked with the media content to form linked content,
      the linked content permitting synchronized playback of the media content and the captured user reaction information.
4. The device of claim 1, where the one or more processors, when receiving the one or more trigger signals, are to:
   detect the one or more trigger signals via one or more components of the device; or
   receive information that identifies the one or more trigger signals from another device.
5. The device of claim 1, where the one or more processors, when receiving the one or more trigger signals, are to:
   receive information that identifies the segment of the media content during which the user reaction information is to be captured;
   determine that the segment of the media content has begun playing; and
   where the one or more processors, when determining that the user reaction information is to be captured, are to:
      determine that the user reaction information is to be captured based on determining that the segment of the media content has begun playing.
6. The device of claim 1, where the one or more processors, when receiving the one or more trigger signals, are to:
   process the media content to determine at least one of:
      a volume level associated with the media content,
      a frequency of sound included in the media content, or
      a rate of change of content across frames of the media content; and
   where the one or more processors, when determining that the user reaction information is to be captured, are to:
      determine that the user reaction information is to be captured based on processing the media content to determine at least one of:
         the volume level,
         the frequency, or
         the rate of change.
7. The device of claim 1, where the one or more processors, when receiving the one or more trigger signals, are to:
   receive information that identifies a type of the media content;
   determine that the media content is of a particular type based on receiving the information that identifies the type of the media content; and
   where the one or more processors, when determining that the user reaction information is to be captured, are to:
      determine that the user reaction information is to be captured based on determining that the media content is of the particular type.
8. A computer-readable medium storing instructions, the instructions comprising:
   one or more instructions that, when executed by one or more processors, cause the one or more processors to:
      receive an indication that media content is being presented;
      detect one or more trigger signals that indicate a point, within the media content, to capture user reaction information associated with a segment of the media content;
      analyze the user reaction information to determine facial recognition information, the facial recognition information indicating at least one emotion of a user;
      determine, based on the one or more trigger signals and based on the facial recognition information indicating the at least one emotion of the user, that the user reaction information is to be captured,
         the user reaction information not being captured for irrelevant user reactions;
      capture the user reaction information, to form captured user reaction information, based on determining that the user reaction information is to be captured,
         the captured user reaction information including an audio recording or a video recording;
      receive an interest level indicator that indicates an interest level associated with the segment of the media content,
         the interest level being determined by analyzing activity information associated with the segment of media content;
      provide information that identifies the interest level in association with presentation of the media content,
         the information that identifies the interest level being displayed as a playback bar,
            the playback bar indicating the interest level via visual information,
               the visual information including at least one of:
                  text indicating the interest level, or
                  a color indicating the interest level; and
      store the captured user reaction information.
9. The computer-readable medium of claim 8, where the one or more instructions, when executed by the one or more processors, further cause the one or more processors to:
   identify the segment of the media content being presented at the point when the user reaction information is being captured; and
   where the one or more instructions, that cause the one or more processors to store the captured user reaction information, cause the one or processors to:
      store the captured user reaction information in association with information that identifies the segment of the media content.
10. The computer-readable medium of claim 8, where the one or more instructions, when executed by the one or more processors, further cause the one or more processors to:
   link the captured user reaction information and the media content to form linked content,
      the linked content permitting concurrent playback of the media content and the captured user reaction information.
11. The computer-readable medium of claim 8, where the one or more instructions, that cause the one or more processors to detect the one or more trigger signals, cause the one or more processors to:
   process captured information,
      the captured information being recorded by a device that includes the one or more processors;
   determine based on processing the captured information, at least one of:
      a volume level associated with the captured information, a frequency of sound included in the captured information, or
a rate of change of content across frame of the captured information; and
where the one or more instructions, that cause the one or more processors to determine that the user reaction information is to be captured, cause the one or more processors to:
determine that the user reaction information is to be captured based on determining at least one of:
the volume level,
the frequency, or
the rate of change.

12. The computer-readable medium of claim 8, where the one or more instructions, that cause the one or more processors to detect the one or more trigger signals, cause the one or more processors to:
detect an environmental factor independent of the media content and the captured user reaction information; and
where the one or more instructions, that cause the one or more processors to determine that the user reaction information is to be captured, cause the one or more processors to:
determine that the user reaction information is to be captured based on the environmental factor.

13. The computer-readable medium of claim 8, where the one or more instructions, that cause the one or more processors to detect the one or more trigger signals, cause the one or more processors to:
detect a plurality of trigger signals that indicate the point to capture the user reaction information; and
where the one or more instructions, that cause the one or more processors to determine that the user reaction information is to be captured, cause the one or more processors to:
determine, based on the plurality of trigger signals, that the user reaction information is to be captured.

14. The computer-readable medium of claim 8, where the at least one emotion of the user comprises a first emotion and a second emotion.

15. A method, comprising:
receiving, by a device, an indication that media content is being presented;
detecting, by the device, one or more trigger signals that indicate a point, within the media content, to capture user reaction information to be associated with a segment of the media content,
the user reaction information including a recording captured by the device during a time period when the segment of the media content is being presented;
analyzing, by the device, the user reaction information to determine facial recognition information,
the facial recognition information indicating at least one emotion of a user;
recording, by the device, based on detecting the one or more trigger signals, based on the facial recognition information indicating the at least one emotion of the user, and without user input, the user reaction information,
the user reaction information not being recorded for irrelevant user reactions;
identifying, by the device, the segment of the media content associated with the user reaction information;
associating, by the device, the user reaction information and the segment of the media content;
receiving, by the device, an interest level indicator that indicates an interest level associated with the segment of the media content,
the interest level being determined by analyzing activity information associated with the segment of media content; and
providing, by the device, information that identifies the interest level in association with presentation of the media content,
the information that identifies the interest level being displayed as a playback bar, and
the playback bar indicating the interest level via visual information,
the visual information including at least one of:
text indicating the interest level, or
a color indicating the interest level.

16. The method of claim 15, further comprising:
analyzing the one or more trigger signals to determine that the user reaction information is to be recorded; and
where recording the user reaction information comprises:
recording the user reaction information based on analyzing the one or more trigger signals.

17. The method of claim 15, where associating the user reaction information and the segment of the media content comprises:
associating the user reaction information and the segment of the media content to form linked content,
the linked content permitting the user reaction information to be presented concurrently with the segment of the media content.

18. The method of claim 15, where providing the information that identifies the interest level comprises:
providing the information that identifies the interest level via visual information associated with the media content.

19. The method of claim 18, where providing the information that identifies the interest level via the visual information comprises:
providing the information that identifies the interest level in association with a portion of the visual information that corresponds to the segment of the media content.

20. The method of claim 15, where the interest level is associated with at least one of:
requesting the segment;
accessing the segment;
playing the segment;
bookmarking the segment;
sharing the segment;
commenting on the segment;
performing a social media action in association with the segment;
rewinding the media content to cause the segment to be played again;
creating other content based on the segment; or
fast-forwarding the media content to cause the segment to be skipped.

* * * * *